ROBERTS & BADGER.
Hop Vine Support.
No. 57,381.
Patented Aug. 21, 1866.
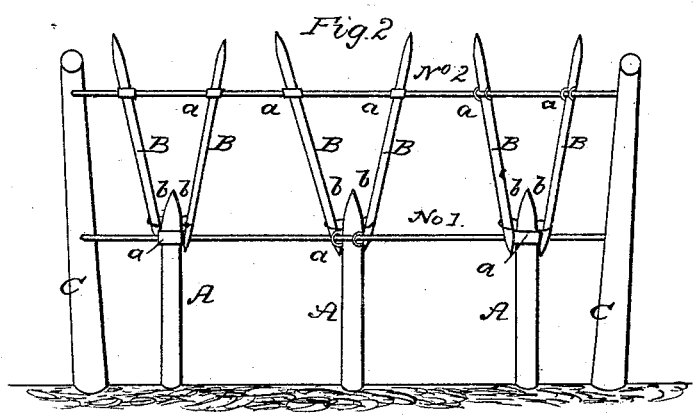
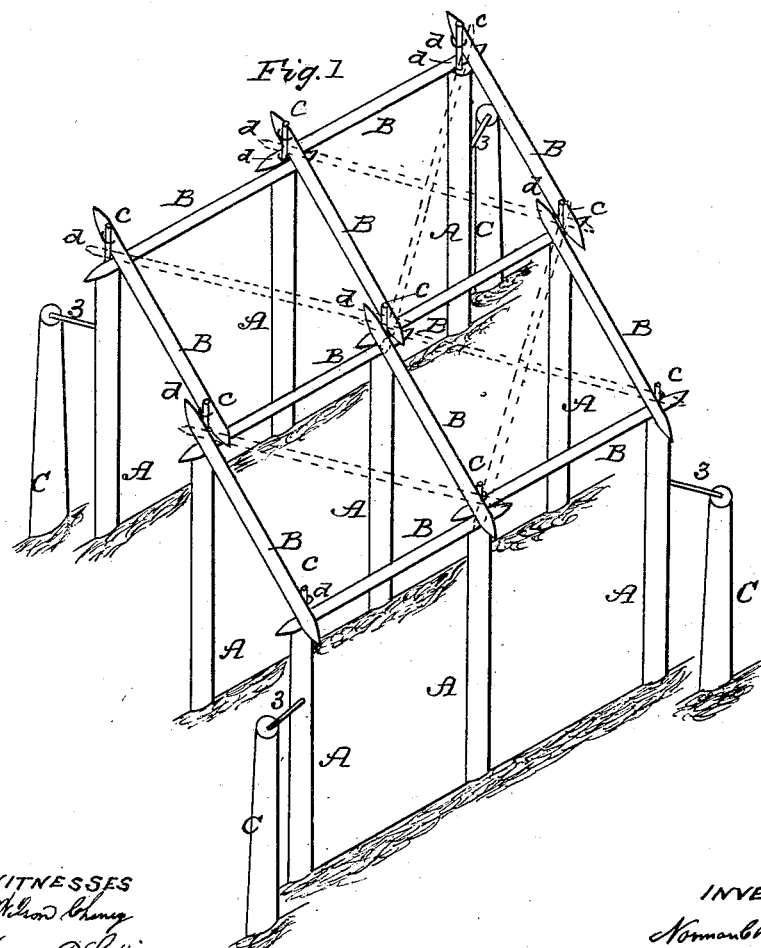
WITNESSES
INVENTORS

UNITED STATES PATENT OFFICE.

NORMAN C. ROBERTS, OF BURLINGTON, AND EZRA W. BADGER, OF OTSEGO, NEW YORK.

IMPROVEMENT IN HOP-VINE SUPPORTS.

Specification forming part of Letters Patent No. 57,381, dated August 21, 1866.

*To all whom it may concern:*

Be it known that we, NORMAN C. ROBERTS, of the town of Burlington, in the county of Otsego and State of New York, and EZRA W. BADGER, of the town of Otsego, in the aforesaid county and State, have invented a new and Improved Mode of Constructing Hop-Rods, to be used in the culture of hops, which we call " Portable Sectional Hop-Rods;" and we do hereby declare that the following is a full, clear, and exact description of the said invention, reference being had to the accompanying drawings, and to the letters of reference marked thereon, in which—

Figure 1 is a perspective view of a hop-yard with the upper section or rods placed horizontal. Fig. 2 is a view of the same with the upper section or rods placed on an angle.

Same letters of reference apply to the same part in each of the figures.

The nature of our invention consists in setting one rod in each hill of hops, and of having other rods or sections suitably connected and supported either horizontally or at any desired angle, by which we are enabled to save a great amount of expense in the raising of hops.

To enable those skilled in the art to make and use our invention, we will proceed to describe its construction.

Different kinds and sizes of rods may be used; but we prefer as best and most economical to saw out rods eight or nine feet long and one and a half inch square for the lower sections, and seven or eight feet long and one inch square for the upper sections, and run said rods through a hollow auger, which will make them round; or, if this is not convenient, they may be used square, and they may be made of any kind of timber.

A represents the lower rod, which is set into the hill of hops the desired depth—say, from four to six inches. In Fig. 2 there is a wire, No. 1, stretched over the hills, to which the upper end of rod A is fastened, and firmly held by means of a loop or bow, (marked *a*.)

We connect the rods A and B by means of the ears or sockets (marked *b*) near the tops of rods A, into which the lower ends of rods B are inserted, and firmly held at the desired angle (being fastened near the top to wire No. 2, which is stretched directly over wire No. 1) by the loops or bows *a* in the same manner as the rods A; or hooks, twine, or small wire may be used to fasten the rods and wire together.

C represents anchor-poles, to which the wires are fastened to support the rods. In the arrangement shown in Fig. 2 the said poles are required to be nearly as high as both sections of rods, and one to each end of every row of hops, while in Fig. 1 they are shorter than rods A, and connected with them by wire No. 3, said anchor-poles being placed at the corners of the hop-yard, and occasionally along at the ends of the rows, sufficient to make the rods stand firm; or said anchor-poles may be dispensed with entirely by setting the rods A deeper in the earth.

*c*, Fig. 1, is a wire driven into the tops of rods A. *d* represents staples near each end of rods B, which slip onto the wire or pins in rods A, rods B being in a horizontal position, and connecting the hills together.

Rods A are connected both ways by the rods B, forming a frame-work sustaining the hop-vine and supporting each other, so that it is impossible for the wind to damage the hops.

By making the rods B of sufficient length they may be placed diagonally across the rows, as shown by the dotted lines in Fig. 1 of the drawings.

The rods A and B may be connected by having a hole near each end of rods B to slip onto the wires in the tops of rods A, or be connected by hooks and staples or pins, or nailing or notching together, or tying together with either string or wire. The rods may be varied considerably as to the position and angle in which they are placed.

There might be a pole placed to any certain number of hills—say nine—and the rods all round run up to the said pole.

There are several great advantages to be gained by adopting our invention. The rods A may be set first and the rods B left off until the hurry of the spring work is over. Said rods are light, and can be set by girls instead of men.

These hop-rods can be housed in winter, which will make them last longer, and they can be cut out of full-grown trees, leaving the thrifty young trees, such as are usually cut down for hop-poles, to grow and come to maturity; and, further, by this invention we dispense with the large holes, eighteen inches deep, in the hills, which fill with water in the autumn, and have a great tendency to heave and injure the hops by freezing through the winter.

This invention is cheaper, and at the same time more substantial and less liable to damage by storms, than any other mode in use.

Having thus described our invention, what we claim as new, and desire to secure by Letters Patent, is—

The arrangement of the rods A and B, the same being connected together substantially as described, whereby the weight of the upper sections, as well as the vine, is made to devolve upon the lower sections, and thus give the frame a firm or solid character, in order to prevent swaying by the wind or sagging from the weight of the vine.

NORMAN C. ROBERTS.
EZRA W. BADGER.

Witnesses:
H. P. SULLIVAN,
S. WILSON CHENEY.